United States Patent
Li et al.

(10) Patent No.: US 10,270,325 B2
(45) Date of Patent: Apr. 23, 2019

(54) SINGLE PHASE PERMANENT MAGNET MOTOR

(71) Applicant: JOHNSON ELECTRIC INTERNATIONAL AG, Murten (CH)

(72) Inventors: Yue Li, Hong Kong (CN); Chui You Zhou, Shenzhen (CN); Yong Wang, Shenzhen (CN); Yong Li, Shenzhen (CN)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 137 days.

(21) Appl. No.: 15/254,544

(22) Filed: Sep. 1, 2016

(65) Prior Publication Data

US 2017/0063186 A1   Mar. 2, 2017

(30) Foreign Application Priority Data

Sep. 1, 2015   (CN) .......................... 2015 1 0552073

(51) Int. Cl.
*H02K 1/27*   (2006.01)
*H02K 21/18*  (2006.01)
*H02K 1/14*   (2006.01)

(52) U.S. Cl.
CPC ........... *H02K 21/185* (2013.01); *H02K 1/143* (2013.01); *H02K 1/278* (2013.01); *H02K 1/2733* (2013.01)

(58) Field of Classification Search
CPC ........ H02K 1/27; H02K 11/21; H02K 1/2753; H02K 21/02; H02K 29/03; H02K 29/08; H02K 1/148; H02K 7/04; H02K 1/2773
See application file for complete search history.

(56) References Cited

U.S. PATENT DOCUMENTS

| | | | | |
|---|---|---|---|---|
| 5,268,607 A | * | 12/1993 | McManus | .................. 310/89 |
| 6,012,217 A | * | 1/2000 | Kliman et al. | ............. 29/596 |
| 2004/0104636 A1 | * | 6/2004 | Ortt et al. | ........... 310/154.08 |
| 2014/0145524 A1 | * | 5/2014 | Tanimoto et al. | ......... 310/50 |
| 2015/0042194 A1 | * | 2/2015 | Li et al. | ............. 310/156.01 |

* cited by examiner

*Primary Examiner* — Naishadh N Desai
(74) *Attorney, Agent, or Firm* — Muncy, Geissler, Olds & Lowe, P.C.

(57) ABSTRACT

The present invention provides a single phase permanent magnet motor including a stator core and a permanent magnet rotor. The stator core includes an end portion and two arm portions extending from the end portion. Each arm portion includes a connecting arm connected to the end portion and a pole claw formed at a distal end of the connecting arm. The two pole claws defines a receiving space. The rotor is rotatably disposed in the receiving space of the stator core. The rotor includes a rotor core made of a magnetic material and at least one permanent magnet attached to the rotor core.

17 Claims, 5 Drawing Sheets

SINGLE PHASE PERMANENT MAGNET MOTOR

CROSS REFERENCE TO RELATED APPLICATIONS

This non-provisional patent application claims priority under 35 U.S.C. § 119(a) from Patent Application No. 201510552073.6 filed in The People's Republic of China on 1 Sep. 2015.

FIELD OF THE INVENTION

The present invention relates to single phase motors, and in particular to a stator core of a single phase permanent magnet motor.

BACKGROUND OF THE INVENTION

A single phase permanent magnet motor usually includes a stator core, stator windings, and a permanent magnet rotor. The stator core is generally U-shaped, including a pair of pole arms. A pair of magnetic poles is formed at distal ends of the pole arms. The permanent magnet rotor is rotatably disposed between the magnetic poles of the stator core. The permanent magnet rotor includes a rotary shaft and a permanent magnetic member fixed to the rotary shaft using an over-molding process. The present invention provides a new single phase permanent magnet motor.

SUMMARY OF THE INVENTION

Accordingly, the present invention provides a single phase permanent magnet motor including a stator core and a permanent magnet rotor. The stator core includes an end portion and two arm portions extending from the end portion. Each arm portion includes a connecting arm connected to the end portion and a pole claw formed at a distal end of the connecting arm. The two pole claws defines a receiving space. The rotor is rotatably disposed in the receiving space of the stator core. The rotor includes a rotor core made of a magnetic material and at least one permanent magnet attached to the rotor core.

Preferably, the permanent magnet is attached to an outer wall surface of the rotor core.

Preferably, the rotor further comprises a molded holder wrapping around the permanent magnet.

Preferably, the molded holder is integrally formed by injection molding.

Preferably, the two pole claws are spaced apart with a slot opening formed there between, and the slot opening has a width less than four times of an air gap formed between the stator core and the rotor.

Preferably, the two pole claws are spaced apart with a slot opening formed there between, and the slot opening has a width less than two times of a minimum air gap formed between the stator core and the rotor.

Preferably, each pole claw includes a wall portion extending from the connecting arm toward the other pole claw, and two wall portions of the two pole claws extend in opposite directions and define a slot opening there between.

Preferably, the two pole claws form an arc pole surface surrounding the rotor, the arc pole surface of each pole claws is inwardly recessed to form a startup grooves, the startup groove is offset from a central axis of the pole claw, and the two startup grooves are spaced 180 degrees along a circumferential direction.

Preferably, the rotor core of the rotor is a hollow and cylindrical and defines a central through hole for receiving a rotary shaft therein.

Preferably, the at least one permanent magnet comprises two spaced permanent magnets, the molded holder comprises an outer ring cover outer wall surfaces of the permanent magnets and two side plates filled in the space between the two permanent magnets, and the side plates are integrally connected with the outer ring.

Preferably, an inner wall surface of the permanent magnet is attached to the rotor core, an outer wall surface includes an arc surface and two plane surfaces formed at two ends of the arc surface, the arc surface of the outer wall surface is coaxial with the inner wall surface, two connecting wall surfaces are formed between the inner wall surface and the two plane surfaces of the outer wall surface, and the two connecting wall surfaces are coplanar.

Preferably, the connecting wall surface is perpendicular to the plane surface, and the plane surfaces at the same side of the two permanent magnets are coplanar.

Preferably, the end portion and the arm portions are respectively formed by stacking a plurality of laminations and are mechanically connected, one of the arm portion and the end portion forms a locking groove, the other of the arm portion and the end portion forms a locking block, and the locking block is engaged in the locking groove to connect the arm portion and the end portion.

DETAILED DESCRIPTION OF THE PREFERRED EMBODIMENTS

Figure 1:
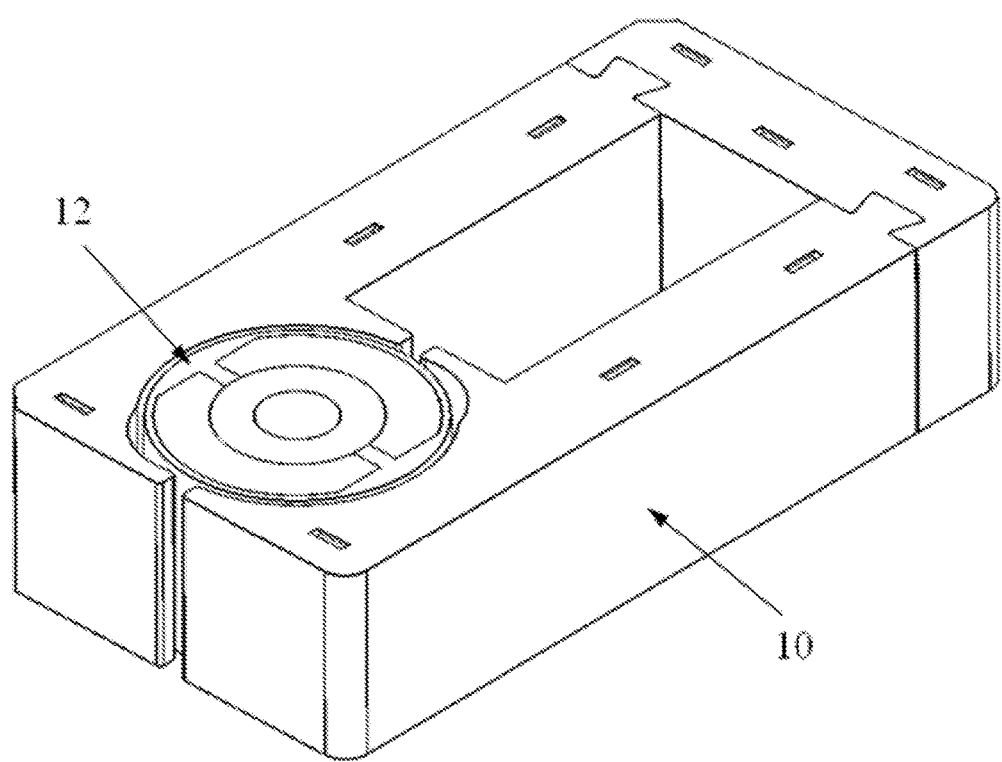
FIG. 1 illustrates a single phase permanent magnet motor according to one embodiment of the present invention.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

FIG. 1 illustrates a single phase permanent magnet motor according to one embodiment of the present invention. The motor includes a stator core 10, windings (not shown) wound around the stator core 10, and a permanent magnet rotor 12 rotatably disposed in the stator core 10. Preferably, in this embodiment, the stator core 10 is generally U shaped, the rotor 12 is received in a rotor receiving space defined in the stator core 10. The stator core 10 forms a pair of magnetic poles which interact with the magnetic poles of the rotor 12 to push the rotor 12 to rotate. In the figures, some parts of the motor, such as the windings, a control circuit for controlling the current of the windings, a motor housing or the like, are not shown, which can be constructed as in a known single phase permanent magnet motor.

Figure 2:
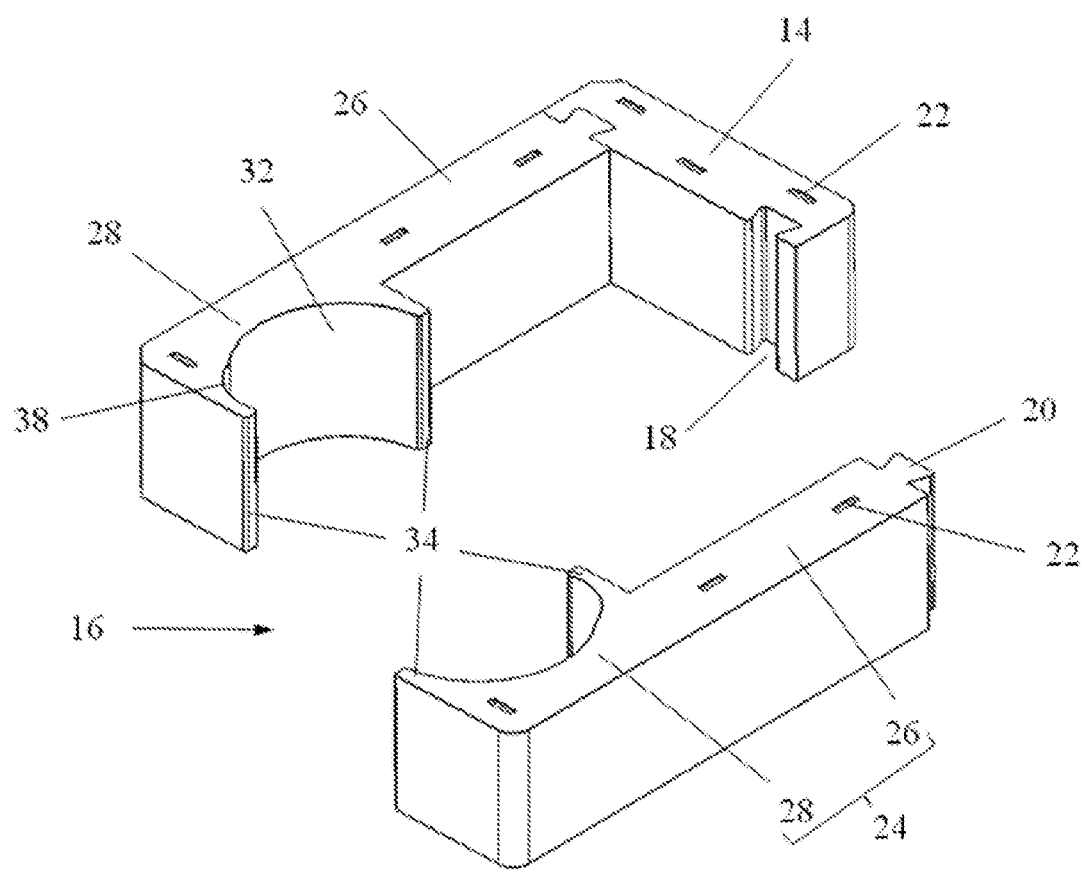
FIG. 2 is an exploded view of a stator core of the motor of FIG. 1.
Figure 5:
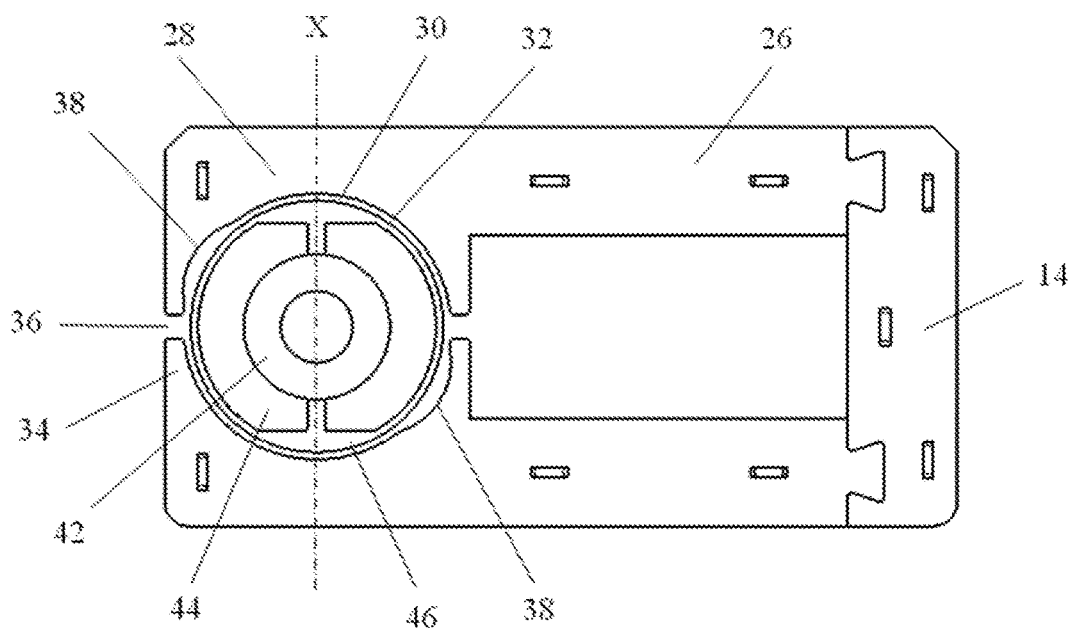
FIG. 5 is a top view of the motor of FIG. 1.

The stator core 10 may be made of a soft magnetic material such as ferrite. Referring to FIG. 2 and FIG. 5, the stator core 10 includes an end portion 14 and a pole arm 16 perpendicularly extending outwardly from the end portion 14. In this embodiment, the end portion 14 and the pole arm 16 are separately formed and then connected together through mechanical connections, which facilitates the winding of the windings. The end portion 14 forms two locking grooves 18. The pole arm 16 projects outwardly to form corresponding locking blocks 20. The locking blocks 20 are respectively inserted into the locking grooves 18 along the axial direction to connect the pole arm 16 with the end portion 14. Preferably, the locking block 20 is dovetail shaped and the locking groove 18 has a shape matching the locking block 20, so that the connection between the locking block 20 and the locking groove 18 is strengthened, to avoid disengagement there between. In another embodiment, the locking grooves 18 may be formed in the pole arm 16, the locking blocks 20 are correspondingly formed on the end portion 14, and the pole arm 16 and the end portion 14 likewise are connected together to form the stator core 10.

Preferably, each of the end portion 14 and the pole arm 16 is made by stacking a plurality of laminations such as silicon steel sheets. The figures only illustrate the overall shapes of the end portion 14 and the pole arm 16 after the laminations are stacked, without showing specific structures of the multiple stacked layers. For facilitating the assembly of the laminations, each lamination is formed with a corresponding assembly hole 22. In this embodiment, the assembly hole 22 is a recessed blind hole and the lamination forms a protrusion corresponding to the blind hole. During stacking the laminations, the protrusion of one lamination is engaged in the assembly hole of an adjacent lamination so as to form a mechanical connection there between. The end portion 14 and the pole arm 16 are respectively formed by the methods.

The pole 16 includes two separate arm portions 24. The two arm portions 24 are parallel to and spaced apart from each other, and have substantially symmetrical construction. Each arm portion 24 is elongated, including a connecting arm 26 and a pole claw 28 formed at a distal end of the connecting arm 26. The two connecting arms 26 are disposed in parallel with each other. An end face of each connecting arm 26 toward the end portion 14 projects outwardly to form one such locking block 20. The end portion 14 overall is in the form of a cuboid, with the locking grooves 18 formed in two sides thereof to connect with the locking blocks 20 of the two connecting arms 26. The two pole claws 28 are located away from the end portion 14 and function as a pair of magnetic poles of the stator core 10. Upon the windings being energized, the magnetic poles are polarized to have opposite polarities. The two pole claws 28 are opposed to and spaced apart from each other, which cooperatively define a space 30 for receiving the rotor 12. Opposed inner wall surfaces of the two pole claws 28 are recessed to form two arc pole surface 32. The arc pole surface 32 surrounds the space 30, and confronts and is spaced from an outer surface of the rotor 12, with an air gap formed there between.

In this embodiment, each pole claw 28 is generally C-shaped, two circumferential sides of which project laterally outwardly relative to the connecting arm 26 to form two wall portions 34, respectively. The wall portions 34 are generally parallel to the end portion 14 and are located in the space between the two connecting arms 26. Preferably, an extending length of the wall portion 34 is less than a half of a width of the space between the connecting arms 26. As such, after assembly of the arm portions 24, the wall portions 34 of the two pole claws 28 are opposed to each other with a small slot opening 36 formed there between. The slot opening 36 is located to face a middle of the space between the two connecting arms 26. The slot opening 36 has a width far less than the width of the spacing between the connecting arms 26, such that the width of the discontinuity in the arc pole surface 32 in the circumferential direction is significantly reduced in comparison with the existing magnetic pole structure, which can effectively reduce the cogging torque, make the rotor 12 rotation smoother, and reduce noise.

Preferably, the width of the slot opening 36 is less than four times of the air gap between the stator core 10 and the rotor 12. More preferably, the width of the slot opening 36 is less than two times of the width of the air gap. In addition, the two slot openings 36 may have different widths, i.e. the arc pole surface 32 may be discontinued at different locations along the circumferential direction with different widths. In this case, the minimum width of the discontinuity in the arc pole surface 32 is less than three times of the width of the air gap between the arc pole surface 32 and the rotor 12, which reduces the magnetic leakage while reducing the cogging torque as much as possible.

Preferably, an inwardly-recessed startup groove 38 is formed in the arc pole surface 32. The startup groove 38 is offset from a central axis X (FIG. 5) of the pole claw 28 by an angle. In this embodiment, there are two startup grooves 38 that are disposed on the two pole claws 28, respectively. One startup groove 38 is located adjacent the wall portion 34 at the inner end of one corresponding pole claw 28, and the other startup groove 38 is located adjacent the wall portion 34 at the outer end of another corresponding pole claw 28. The two startup grooves 38 are spaced 180 degrees along the circumferential direction. The arc pole surface 32 and the rotor 12 have the greatest air gap there between at the area of the startup groove 38, such that when the motor is powered off and the rotor stops rotation, a pole axis of the rotor 12 is offset from the central axis X of the pole claw 28 by an angle, thus avoiding a dead point, thereby ensuring that the motor can be successfully started upon when it is energized again.

Figure 3:
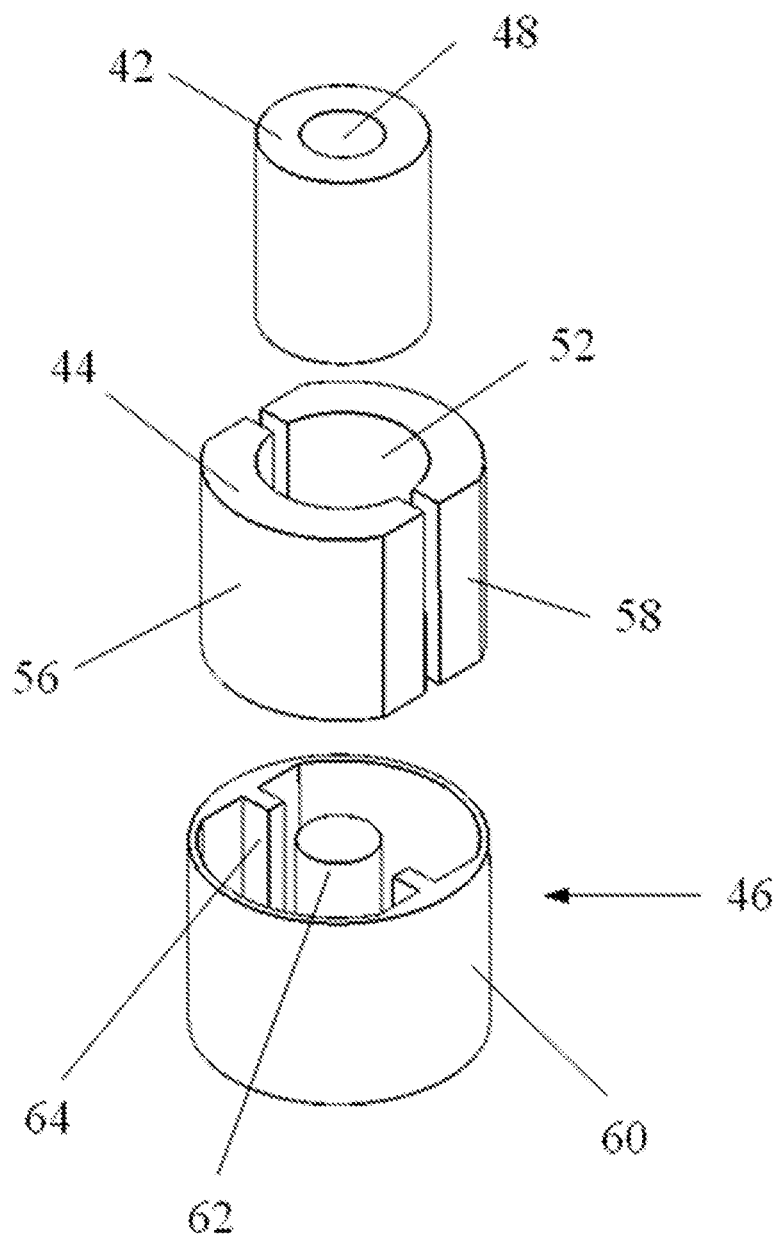
FIG. 3 is an exploded view of a permanent magnet rotor of the motor of FIG. 1.
Figure 4:
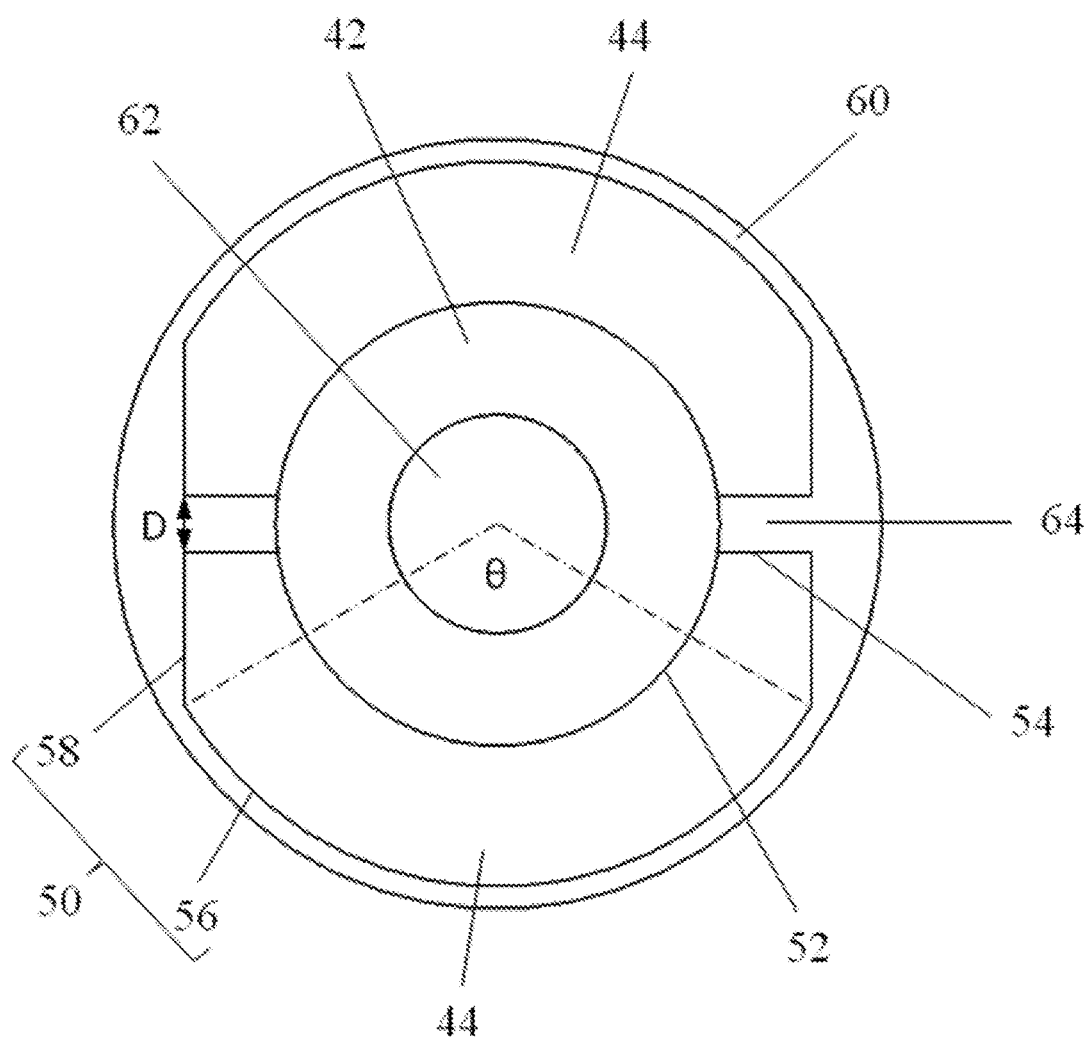
FIG. 4 is a top view of a permanent magnet rotor of the motor of FIG. 1.

Referring also to FIG. 3 to FIG. 5, the permanent magnet rotor 12 includes a rotary shaft 62, a rotor core 42 fixed to the rotary shaft 62, and two permanent magnets 44 attached to the rotor core 42.

The rotor core 42 is preferably made of a soft magnetic material such as ferrite, which is overall in the shape of a hollow cylinder. Preferably, the rotor core 42 defines a through hole 48 at a center thereof for allowing the rotary shaft 62 to pass through. The two permanent magnets 44 are attached to an outer wall surface of the rotor core 42 and are symmetrically disposed. The two permanent magnets 44 are spaced from each other in the circumferential direction. The two permanent magnets 44 are radially magnetized and have opposite polarities. In the present embodiment, each permanent magnet 44 is generally semi-annular shaped, covering nearly a half circumference of the rotor core 42 in the circumferential direction. The permanent magnet 44 includes a radial outer wall surface 50, a radial inner wall surface 52, and two coplanar connecting wall surfaces 54 connecting the outer wall surface 50 and the inner wall surface 52. Preferably, the outer wall surface 50 and the inner wall surface 52 are coaxial with each other, and the inner wall surface 52 is attached to the outer wall surface of the rotor core 42. The outer wall surface 50 includes an arc surface 56 and two plane surfaces 58 extending from two circumferential ends of the arc surface 56 to the connecting wall surface 54. The arc surface 56 which is coaxial with the rotor 12 acts as the arc pole surface of the permanent magnet 44. The two plane surfaces 58 are disposed in parallel with each other and perpendicularly connected with the connecting wall surfaces 54 for facilitating positioning.

The connecting wall surfaces 54 of the two permanent magnets 44 are opposed to each other and disposed in parallel with each other. The connecting wall surfaces 54 of the two permanent magnets 44 are spaced from each other. The two arc surfaces 56 of the two permanent magnets 44 are located on a cylindrical surface coaxial with the rotor 12. The two plane surfaces 58 at the same side of the two permanent magnets 44 are coplanar.

The permanent magnet 44 of the rotor of the single phase permanent magnet motor of the present invention is fixed to the magnetic-conductive rotor core 42, which can increase the magnetic field intensity of the rotor and hence increase the power density of the motor.

Preferably, the rotor further includes a molded holder 46 which wraps around the permanent magnets 44 to reinforce the strength of the connection between the permanent magnets 44 and the rotor core 42. The molded holder 46 may be formed by injection molding. In the molding process, the rotor core 42 and the permanent magnets 44 are placed in a mold, plastic is injected into the mold to form the molded holder 46 around the rotor core 42 and the permanent magnets 44, thus preassembling the rotor 12 into one piece. Such rotor 12 can be easily formed. The molded holder 46 covers the whole outer wall surface 50 of the permanent magnets 44 and fills the gap between the permanent magnets 44 and the rotor core 42. The molded holder 46 includes an outer ring 60 surrounding the permanent magnets 44 and two side plates 64 filled in the gap between the two permanent magnets 44. The outer surface of the outer ring 60 is generally a standard cylindrical surface which is coaxial with the rotor core 42. The side plate 46 has an outer end integrally connected with the outer ring 44 and an inner end connected to the outer wall surface of the rotor core 42, thus separating the two permanent magnets 44 apart.

In the above embodiment of the present invention, the two pole claws 26 of the stator core 10 extend outwardly to form the wall portions 34, and the wall portions 34 define the narrow slot openings 36, thereby effectively reducing the magnetic leakage while reducing the cogging torque as much as possible. The permanent magnet rotor 12 includes a rotor core 42, and the permanent magnets 44 are fixed to the outer surface of the rotor core 42, which increases the magnetic field intensity of the rotor and hence increases the power density of the motor. In addition, the rotor core 42 and permanent magnets 44 of the rotor 12 are integrally connected through the molded holder 46, which can preassemble the rotor 12 into a one piece body for facilitating the assembly and transportation of the rotor 12.

Although the invention is described with reference to one or more preferred embodiments, it should be appreciated by those skilled in the art that various modifications are possible. Therefore, the scope of the invention is to be determined by reference to the claims that follow.

The invention claimed is:

1. A single phase permanent magnet motor comprising:
    a stator core comprising an end portion and two arm portions extending from the end portion, each arm portion comprising a connecting arm connected to the end portion and a pole claw formed at a distal end of the connecting arm, the two pole claws defining a receiving space; and
    a permanent magnet rotor rotatably disposed in the receiving space of the stator core, the rotor comprising a rotor core and at least one permanent magnet attached to the rotor core, the rotor core being made of a magnetic material,
    wherein the two pole claws are spaced apart with a slot opening formed there between, and the slot opening has a width less than four times of an air gap formed between the stator core and the rotor.

2. The single phase permanent magnet motor of claim 1, wherein the permanent magnet is attached to an outer wall surface of the rotor core.

3. The single phase permanent magnet motor of claim 1, wherein the rotor further comprises a molded holder wrapping around the permanent magnet.

4. The single phase permanent magnet motor of claim 3, wherein the molded holder is integrally formed by injection molding.

5. The single phase permanent magnet motor of claim 1, wherein the two pole claws are spaced apart with a slot opening formed there between, and the slot opening has a width less than two times of a minimum air gap formed between the stator core and the rotor.

6. The single phase permanent magnet motor of claim 1, wherein each pole claw includes a wall portion extending from the connecting arm toward the other pole claw, and two wall portions of the two pole claws extend in opposite directions and define a slot opening there between.

7. The single phase permanent magnet motor of claim 3, wherein the rotor core of the rotor is a hollow and cylindrical and defines a central through hole for receiving a rotary shaft therein.

8. The single phase permanent magnet motor of claim 3, wherein the at least one permanent magnet comprises two spaced permanent magnets, the molded holder comprises an outer ring covering outer wall surfaces of the permanent magnets and two side plates filled in the space between the two permanent magnets, and the side plates are integrally connected with the outer ring.

9. The single phase permanent magnet motor of claim 8, wherein an inner wall surface of the permanent magnet is attached to the rotor core, an outer wall surface includes an arc surface and two plane surfaces formed at two ends of the arc surface, the arc surface of the outer wall surface is coaxial with the inner wall surface, two connecting wall surfaces are formed between the inner wall surface and the two plane surfaces of the outer wall surface, and the two connecting wall surfaces are coplanar.

10. The single phase permanent magnet motor of claim 9, wherein the connecting wall surface is perpendicular to the plane surface, and the plane surfaces at the same side of the two permanent magnets are coplanar.

11. The single phase permanent magnet motor of claim 1, wherein the end portion and the arm portions are respectively formed by stacking a plurality of laminations and are mechanically connected, one of the arm portion and the end portion forms a locking groove, the other of the arm portion and the end portion forms a locking block, and the locking block is engaged in the locking groove to connect the arm portion and the end portion.

12. A single phase permanent magnet motor comprising:
    a stator core comprising an end portion and two arm portions extending from the end portion, each arm portion comprising a connecting arm connected to the end portion and a pole claw formed at a distal end of the connecting arm, the two pole claws defining a receiving space; and
    a permanent magnet rotor rotatably disposed in the receiving space of the stator core, the rotor comprising a rotor core and at least one permanent magnet attached to the rotor core, the rotor core being made of a magnetic material, wherein the two pole claws form an arc pole surface surrounding the rotor, the arc pole surface of each pole claws is inwardly recessed to form a startup grooves, the startup groove is offset from a central axis of the pole claw, and the two startup grooves are spaced 180 degrees along a circumferential direction.

13. The single phase permanent magnet motor of claim 12, wherein the rotor further comprises a molded holder wrapping around the permanent magnet.

14. The single phase permanent magnet motor of claim 13, wherein the rotor core of the rotor is a hollow and cylindrical and defines a central through hole for receiving a rotary shaft therein.

15. The single phase permanent magnet motor of claim 14, wherein the at least one permanent magnet comprises two spaced permanent magnets, the molded holder comprises an outer ring covering outer wall surfaces of the permanent magnets and two side plates filled in the space between the two permanent magnets, and the side plates are integrally connected with the outer ring.

16. The single phase permanent magnet motor of claim 15, wherein an inner wall surface of the permanent magnet is attached to the rotor core, an outer wall surface includes an arc surface and two plane surfaces formed at two ends of the arc surface, the arc surface of the outer wall surface is coaxial with the inner wall surface, two connecting wall surfaces are formed between the inner wall surface and the two plane surfaces of the outer wall surface, and the two connecting wall surfaces are coplanar.

17. The single phase permanent magnet motor of claim 16, wherein the connecting wall surface is perpendicular to the plane surface, and the plane surfaces at the same side of the two permanent magnets are coplanar.

* * * * *